United States Patent
Uchida et al.

(10) Patent No.: US 11,203,353 B2
(45) Date of Patent: Dec. 21, 2021

(54) STEERING CONTROL SYSTEM, STEERING SYSTEM, CAR, STEERING CONTROL METHOD AND RECORDING MEDIUM

(71) Applicant: MITSUBISHI HEAVY INDUSTRIES, LTD., Tokyo (JP)

(72) Inventors: Koji Uchida, Tokyo (JP); Hiroyuki Kono, Tokyo (JP); Akihisa Kawauchi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 257 days.

(21) Appl. No.: 16/294,994

(22) Filed: Mar. 7, 2019

(65) Prior Publication Data

US 2019/0276043 A1  Sep. 12, 2019

(30) Foreign Application Priority Data

Mar. 9, 2018 (JP) .............................. JP2018-043599
Feb. 7, 2019 (JP) .............................. JP2019-020968

(51) Int. Cl.

| B60W 50/06 | (2006.01) |
|---|---|
| B60W 40/112 | (2012.01) |
| B62D 6/00 | (2006.01) |
| B60W 40/109 | (2012.01) |
| B60W 30/045 | (2012.01) |
| B60W 10/20 | (2006.01) |
| B60W 50/00 | (2006.01) |

(52) U.S. Cl.
CPC ............ *B60W 50/06* (2013.01); *B60W 10/20* (2013.01); *B60W 30/045* (2013.01); *B60W 40/109* (2013.01); *B60W 40/112* (2013.01); *B62D 6/008* (2013.01); *B60W 2050/0008* (2013.01); *B60W 2050/0012* (2013.01); *B60W 2050/0014* (2013.01); *B60W 2050/0075* (2013.01); *B60W 2556/10* (2020.02)

(58) Field of Classification Search
CPC ...................................................... B60W 50/06
See application file for complete search history.

(56) References Cited

U.S. PATENT DOCUMENTS

| 8,543,261 B2* | 9/2013 | Anderson | B60W 30/09 |
|---|---|---|---|
| | | | 701/3 |
| 9,090,279 B2* | 7/2015 | Buerkle | B60W 30/10 |
| (Continued) | | | |

FOREIGN PATENT DOCUMENTS

| WO | 2004040391 A1 | 5/2004 |
|---|---|---|
| WO | 2013094336 A1 | 6/2013 |

*Primary Examiner* — Alex C Dunn
(74) *Attorney, Agent, or Firm* — Kanesaka Berner and Partners LLP

(57) ABSTRACT

A steering control system includes: a deviation amount detection unit configured to detect a deviation amount of a car that travels on a track, from a reference traveling path of the car in a width direction of the track; a roll or lateral direction vibration amount detection unit configured to detect a roll or lateral direction vibration amount of the car; and a feedback control unit configured to perform feedback control of steering of the car so as to reduce the deviation amount and the roll or lateral direction vibration amount. The feedback control unit is configured to output a steering command value in which a specified frequency to be reduced is suppressed.

9 Claims, 10 Drawing Sheets

(56) References Cited

U.S. PATENT DOCUMENTS

| | | | | |
|---|---|---|---|---|
| 9,731,755 | B1* | 8/2017 | Moshchuk | B62D 6/00 |
| 10,303,166 | B2* | 5/2019 | Iagnemma | B60W 50/14 |
| 10,515,321 | B2* | 12/2019 | Zhu | B60W 40/04 |
| 2006/0200280 | A1 | 9/2006 | Kono et al. | |
| 2014/0290525 | A1 | 10/2014 | Maeyama et al. | |
| 2015/0134204 | A1* | 5/2015 | Kunihiro | B60W 40/112 |
| | | | | 701/41 |
| 2017/0371349 | A1* | 12/2017 | Kim | G05D 1/0274 |
| 2018/0057053 | A1* | 3/2018 | Tokoro | B60W 30/10 |
| 2018/0154938 | A1* | 6/2018 | Kataoka | B62D 15/025 |
| 2018/0284785 | A1* | 10/2018 | Berntorp | B60W 30/08 |
| 2019/0206261 | A1* | 7/2019 | Szymczak | B60W 30/165 |
| 2019/0219681 | A1* | 7/2019 | Atsushi | G01S 13/931 |
| 2019/0300044 | A1* | 10/2019 | Tsubaki | B62D 6/007 |
| 2019/0337556 | A1* | 11/2019 | Tsubaki | B62D 15/025 |

\* cited by examiner

STEERING CONTROL SYSTEM, STEERING SYSTEM, CAR, STEERING CONTROL METHOD AND RECORDING MEDIUM

CROSS REFERENCE TO RELATED APPLICATIONS

This application claims priority from Japanese Patent Application No. 2018-043599 filed Mar. 9, 2018, and Japanese Patent Application No. 2019-020968 filed Feb. 7, 2019, the contents of which are incorporated herein by reference.

BACKGROUND OF THE INVENTION

Field of the Invention

The present invention relates to a steering control system, a steering system, a car, a steering control method, and a recording medium.

Description of Related Art

As a steering method in the new transportation system, there is a method where a guide rail is installed along a track as in an AGT (Automated Guideway Transit), and the car travels while pushing the guide wheel against the guide rail. By pushing the guide wheel against the guide rail, the car travels in the direction along the guide rail, that is, in a direction along the track.

In this way, in the method in which the car travels while pushing the guide wheel against the guide rail, roll or lateral direction vibration occurs in the car due to unevenness and the like of the surface of the guide rail, so that the ride comfort may be lowered.

On the other hand, in the transportation system described in International Publication No. 2013/094336 (hereinafter referred to as Patent Document 1), a passive steering section and active steering are provided, and in the active steering section, the car travels on a track under autonomous steering. In the active steering section, the car measures the lateral displacement of the car by a displacement sensor, and operates a steering link mechanism so that left and right clearances are always constant. In the active steering section, it is not necessary to press the guide wheels against the guide rail, and it is possible to avoid the occurrence of roll or lateral direction vibration in the car due to the unevenness and the like of the surface of the guide rail.

In addition, the steering apparatus for a vehicle having no contact with a track, described in International Publication No. 2004/040391 (hereinafter referred to as Patent Document 2) performs machine learning by a neural network or a genetic algorithm and the like, and calculates a target steering angle using the result of the machine learning.

SUMMARY OF THE INVENTION

When the car automatically steers without pushing the guide wheel against the guide rail, then when changing of the traveling direction is repeated by overshooting of the steering, the car repeatedly changes in the traveling direction, so that roll or lateral direction vibration occurs in the car and the ride comfort is lowered. On the other hand, if feedback control gain is made small, it is possible to reduce the repetition of changing the traveling direction. However, deviation from a scheduled traveling path becomes large so that it is necessary to increase the width of the track, and this leads to an increase in equipment cost.

When the car automatically steers, it is preferable that both a reduction in roll or lateral direction vibration of the car and a reduction in deviation from a scheduled traveling path can be compatible.

The present invention provides a steering control system, a steering system, a car, a steering control method, and program that are capable of achieving both a reduction in roll or lateral direction vibration of a car and a reduction in deviation from a scheduled traveling path, when a car automatically steers.

According to a first aspect of the present invention, a steering control system includes: a deviation amount detection unit configured to detect a deviation amount of a car that travels on a track, from a reference traveling path of the car in a width direction of the track; a roll or lateral direction vibration amount detection unit configured to detect a roll or lateral direction vibration amount of the car; and a feedback control unit configured to perform feedback control of steering of the car so as to reduce the deviation amount and the roll or lateral direction vibration amount. The feedback control unit is configured to output a steering command value in which a specified frequency to be reduced is suppressed.

The steering control system may further include: a storage unit configured to store steering pattern information indicating a steering command value for each traveling position of the car; a traveling position detection unit configured to detect a traveling position of the car; and a feedforward control unit configured to output, based on the steering pattern information, the steering command value associated with the traveling position detected by the traveling position detection unit.

The steering control system may further include: a load detection unit configured to detect a load of the car. The storage unit may be configured to store steering pattern information for each load of the car. The feedforward control unit may be configured to output the steering command value associated with the detected traveling position of the car, based on the steering pattern information corresponding to the load detected by the load detection unit.

The feedback control unit may apply a frequency filter to remove or reduce the specified frequency to be reduced.

The feedback control unit may be configured to apply the frequency filter, to remove or reduce a vibration of a predetermined frequency determined as a frequency that easily affects ride comfort.

The feedback control unit may be configured to apply the frequency filter to remove or reduce a vibration of a natural frequency of the car.

The feedback control unit may be configured to specify the frequency to be reduced by calculating a natural frequency of the car. The frequency to be reduced may be specified by simulation using a car including an undercarriage, an air spring, and a car body. The frequency to be reduced may be a frequency that easily affects ride comfort of the car. The frequency to be reduced may be a natural frequency of the car.

According to a second aspect of the present invention, a steering system includes a car and a car control device. The car includes: a deviation amount detection unit configured to detect a deviation amount of the car that travels on a track, from a reference traveling path of the car in a width direction of the track; and a roll or lateral direction vibration amount detection unit configured to detect a roll or lateral direction vibration amount of the car. The car control device comprises: a feedback control unit configured to perform feedback control of steering of the car so as to reduce the deviation amount and the roll or lateral direction vibration amount. The feedback control unit is configured to output a steering command value in which a specified frequency to be reduced is suppressed.

According to a third aspect of the present invention, a car includes: a deviation amount detection unit configured to detect a deviation amount of the car that travels on a track, from a reference traveling path of the car in a width direction of the track; a roll or lateral direction vibration amount detection unit configured to detect a roll or lateral direction vibration amount of the car; and a feedback control unit configured to perform feedback control of steering of the car so as to reduce the deviation amount and the roll or lateral direction vibration amount. The feedback control unit is configured to output a steering command value in which a specified frequency to be reduced is suppressed.

The car may further include: an actuator configured to operate in accordance with the feedback control of the feedback control unit, the actuator being provided with a first-order lag element for a steering command value.

According to a fourth aspect of the present invention, a steering control method includes: detecting a deviation amount of a car that travels on a track, from a reference traveling path of the car in a width direction of the track; detecting a roll or lateral direction vibration amount of the car; and performing feedback control of steering of the car so as to reduce the deviation amount and the roll or lateral direction vibration amount. The performing the feedback control includes outputting a steering command value in which a specified frequency to be reduced is suppressed.

According to a fifth aspect of the present invention, a recording medium is a non-transitory computer readable recording medium that stores a program causing a computer to execute: obtaining information of a deviation amount of a car that travels on a track, from a reference traveling path of the car in a width direction of the track; obtaining information of a roll or lateral direction vibration amount of the car; and performing feedback control of a traveling direction of the car so as to reduce the deviation amount and the roll or lateral direction vibration amount, and the performing the feedback control unit includes outputting a steering command value in which a specified frequency to be reduced is suppressed.

According to the steering control system, the steering system, the car, the steering control method, and the recording medium, it is possible to achieve both a reduction in roll or lateral direction vibration of the car and a reduction in deviation from a scheduled traveling path, when the car automatically steers.

DETAILED DESCRIPTION OF THE INVENTION

Hereinafter, embodiments of the present invention will be described. The following embodiments do not limit the claimed invention. In addition, all combinations of features described in the embodiments are not necessarily essential for a solution means of the invention.

First Embodiment

Figure 1:
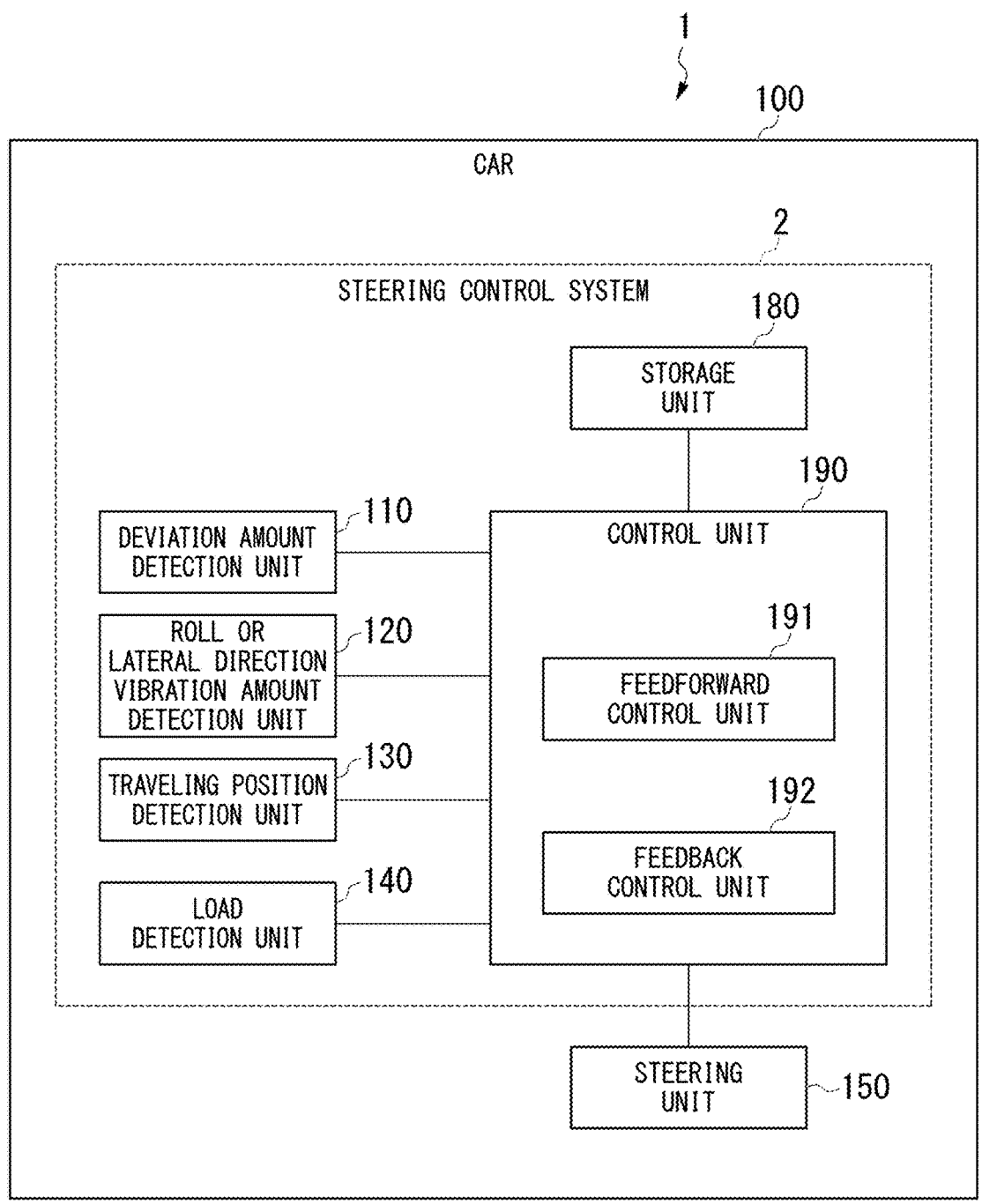
FIG. 1 is a schematic block diagram showing a functional configuration of a car according to a first embodiment.

FIG. 1 is a schematic block diagram showing a functional configuration of a car 100 according to a first embodiment. As shown in FIG. 1, the car 100 includes; a deviation amount detection unit 110, a roll or lateral direction vibration amount detection unit 120, a travel position detection unit (kilometrage detection unit) 130, a load detection unit 140, a steering unit 150, a storage unit 180, and a control unit 190. The control unit 190 includes a feedforward control unit 191, and a feedback control unit 192.

The car 100 has traveling tires, guide wheels, and branch wheels, and is capable of traveling as a car of an AGT (Automated Guideway Transit). However, the car 100 is different from a general AGT car in that it can autonomously steer and travel without using a guide rail and a branch rail. The steering referred to here is to control the traveling direction of a moving body, such as the traveling direction of a car.

The deviation amount detection unit 110 detects the deviation amount from a reference traveling path, of a position in the lateral direction (the width direction of a track) of the car 100 in a track. Here, the track is an area in which the car 100 can travel. For example, when left and right guide rails are installed on the road surface so that the car 100 can travel between these left and right guide rails, the area between the left and right guide rails corresponds to an example of a track.

The reference traveling path referred to here is a path preset within the range of the track as the traveling path of the car 100.

Hereinafter, the deviation amount from the reference traveling path, of the position in the lateral direction of the car 100 in the track, will be referred to as the lateral deviation amount of the car 100.

For example, when the reference traveling path is set as a path passing through the center of the track, the deviation amount detection unit 110 may be configured to include distance sensors installed on the left and right sides of the car. Then the deviation amount detection unit 110 may detect the difference between the distance from the car 100 to the left side of the track, and the distance from the car 100 to the right side of the track as the deviation amount. An example of the installation position of the distance sensor of the deviation amount detection unit 110 in this case will be described with reference to FIG. 2.

Figure 2:
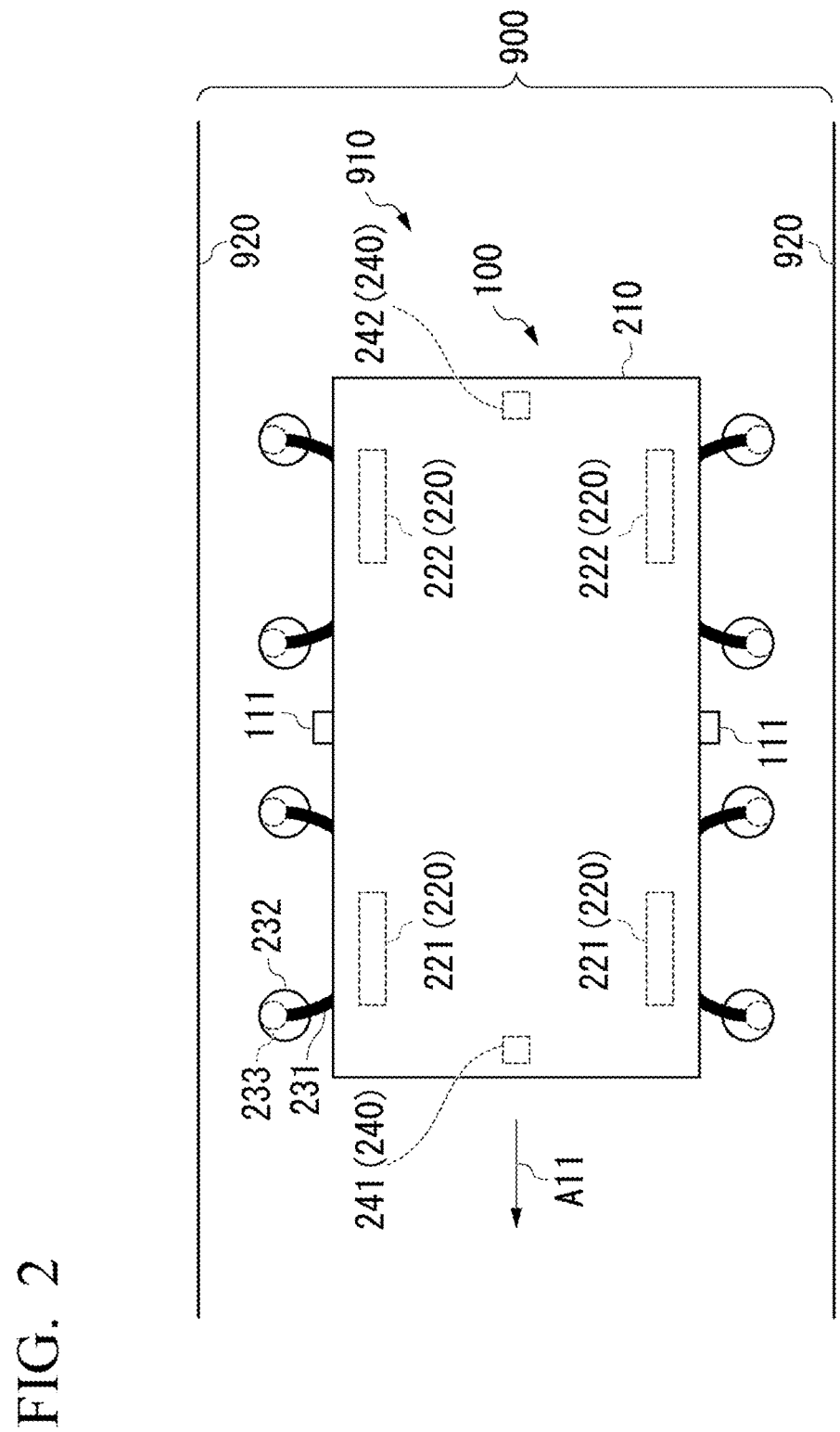
FIG. 2 is a diagram showing an example of an installation position of a distance sensor in the car according to the first embodiment.

FIG. 2 is a diagram showing an example of the installation position of the distance sensor in the car 100. As shown in FIG. 2, the car 100 includes, in addition to the respective parts described with reference to FIG. 1, a car body 210, front traveling tires 221, rear traveling tires 222, supports 231, guide wheels 232, branch wheels 233, distance sensors 111 configured as a part of the deviation amount detection unit 110 (FIG. 1), and a front side acceleration sensor 241 and a rear side acceleration sensor 242 configured as a part of the roll or lateral direction vibration amount detection unit 120 (FIG. 1)

Also in FIG. 2 there is shown a track 900. A road surface 910 and side walls 920 are shown as a part of the track 900. In FIG. 2 is shown an example of the case of an autonomous traveling section in which the car 100 itself travels, and the track 900 does not have a guide rail and a branch rail. The car 100 and the facilities for the car 100 to travel, such as the track 900, are collectively referred to as a traffic system.

Moreover, the traveling direction of the car 100 in the example of FIG. 2 is indicated by an arrow A11. The front and rear, left and right here are front and rear, left and right as viewed from the traveling direction of the car 100. That is, the right and the left here are the right and left, respectively, in the traveling direction of the car 100. The front or front side is the traveling direction side of the car 100. The rear or rear side is the opposite side to the traveling direction of the car 100.

The front side acceleration sensor 241 is installed on the front side of the car 100, and the rear side acceleration sensor 242 is installed on the rear side of the car 100.

The front side acceleration sensor 241 and the rear side acceleration sensor 242 each output measured values of lateral acceleration, for example, with the right side as positive and the left side as negative. Alternatively, the front side acceleration sensor 241 and the rear side acceleration sensor 242 may each output measured values of lateral acceleration with the left side as positive and the right side as negative.

The front side acceleration sensor 241 and the rear side acceleration sensor 242 are collectively referred to as an acceleration sensor 240.

The front traveling tires 221 are installed on the front side of the car 100, and the rear traveling tires 222 are installed on the rear side of the car 100.

Both the front traveling tires 221 and the rear traveling tires 222 are provided so as to be changeable in direction, and are used for driving and steering the car 100. In particular, by changing the direction of either or both of the front traveling tires 221 and the rear traveling tires 222, the traveling direction of the car 100 changes. The front traveling tires 221 and the rear traveling tires 222 are collectively referred to as traveling tires 220.

As shown in FIG. 2, the distance sensors 111 are installed on each of the left and right side surfaces of the car body 210, and measure the distance to a distance detection target such as the side wall 920, for example. Thereby, the position of the car 100 in the width direction of the track 900 (the lateral direction of the car 100) can be detected.

The guide wheels 232 and the branch wheels 233 are used in the same way as in the case of a general AGT in a guidance section in which steering of the car 100 is performed using guide rails and branch rails. The guide wheel 232 is pressed against the guide rail, and the car 100 travels along the guide rail. At the branch point, the branch wheel of the left or right direction curve is fitted into a U-shaped branch rail, and the car 100 runs along the branch rail.

The roll or lateral direction vibration amount detection unit 120 detects the roll or lateral direction vibration amount of the car 100. For example, the roll or lateral direction vibration amount detection unit 120 includes an acceleration sensor, and detects the lateral acceleration of the car 100 or the accumulated amount of acceleration as a roll or lateral direction vibration amount. For example, in the example of FIG. 2, the roll or lateral direction vibration amount detection unit 120 calculates the sum of the acceleration measurement value of the front acceleration sensor 241 and the acceleration measurement value of the rear acceleration sensor 242 as a value indicating the roll or lateral direction vibration amount of the car 100. More specifically, the magnitude (absolute value) of the sum of the acceleration measurement value of the front side acceleration sensor 241 and the acceleration measurement value of the rear side acceleration sensor 242 indicates the roll or lateral direction vibration amount of the car 100.

However, the method by which the roll or lateral direction vibration amount detection unit 120 detects the roll or lateral direction vibration amount of the car 100 is not limited to this. For example, one acceleration sensor may be provided for the car 100, and the roll or lateral direction vibration amount detection unit 120 may detect the magnitude of the lateral acceleration of the car 100 measured by the acceleration sensor as the roll or lateral direction vibration amount of the car 100.

The roll or lateral direction vibration amount detection unit 120 may calculate the change amount of the yaw angle of the car 100 in addition to the roll or lateral direction vibration amount of the car 100. The yaw angle referred to here is the angle formed by the traveling direction of the car 100 with respect to a reference direction such as eastward. For example, the roll or lateral direction vibration amount detection unit 120 may calculate as the change amount of the yaw angle, the magnitude of the change per unit time of the difference obtained by subtracting the acceleration measurement value of the front acceleration sensor 241 from the acceleration measurement value of the rear acceleration sensor 242.

However, the method of acquiring the change amount of the yaw angle of the car 100 by the roll or lateral direction vibration amount detection unit 120 is not limited to this. For example, the roll or lateral direction vibration amount detection unit 120 may be provided with a gyroscope to detect the yaw angle of the car 100 and calculate the magnitude of change in the yaw angle per unit time.

In addition, it is not essential to use the change amount of the yaw angle for controlling the car 100. Therefore, it is not essential for the roll or lateral direction vibration amount detection unit 120 to acquire the change amount of the yaw angle.

The traveling position detection unit 130 detects the traveling position of the car 100. The traveling position may be in kilometers. The kilometer distance may mean the position expressed in kilometers as a unit. For example, the traveling position detection unit 130 is configured to include an odometer that converts the rotation speed of the traveling tire 220 into a traveling distance, and outputs the traveling distance from the starting station as the traveling position. In addition, a marker is provided on the track, and the traveling position at the position of the marker is measured in advance. The traveling position detection unit 130 knows the traveling position at the position of the marker, and when the marker is detected, updates the traveling position being measured to the position of the marker, thereby correcting any measurement error of the traveling position by the odometer.

The traveling position detection unit 130 may be provided on the side of the track 900. For example, an object detection sensor for detecting the car 100 passing through the position may be provided for each position (traveling position) in the track 900. In this case, when detecting the car 100 passing through the position of the sensor, the object detection sensor may notify (transmit) the position of the sensor to the car 100.

The load detection unit 140 detects a load (deadweight) of the car 100. The load of the car 100 is the total weight of a person and an object and the like accommodated in the car 100, such as the load of a passenger getting into the car 100 and the load thereof. The load of the car 100 detected by the load detection unit 140 is used for steering control of the car 100. This is because the turning path of the car 100 varies depending on the load even if the direction of the traveling tire 220 is the same. The heavier the load, the harder for the car 100 to turn.

The load of the car 100 detected by the load detection unit 140 may be any value as long as it indicates to what extent the car 100 is easy to turn, and is not limited to only the load of the car 100. For example, the load detection unit 140 may measure the total weight of the car 100, which is the sum of the load of the car 100 and the weight of the car 100 itself.

The steering unit 150 changes the direction of the traveling tires 220 according to the control of the control unit 190. As a result, the steering unit 150 executes automatic steering of the car 100.

The storage unit 180 stores various data. In particular, the storage unit 180 stores steering pattern information. The steering pattern information referred to here is information indicating the steering command value for each traveling position of the car 100. As the steering command value, for example, a steering angle can be used.

Since the car 100 travels on the track 900 and the reference traveling path can be set on the track 900, and the traveling schedule (speed pattern) is determined with respect to the speed of the car 100, it is possible to generate the steering pattern information in advance.

As described above, even if the direction of the traveling tires 220 is the same, since the turning path of the car 100 varies depending on the load, the storage unit 180 stores the steering pattern information for each load of the car 100.

The control unit 190 controls each component in the car 100 and performs various processes. In particular, the control unit 190 outputs the steering command value to the steering unit 150. As a result, the control unit 190 controls the steering unit 150 to change the direction of the traveling tires 220. Thereby, the control unit 190 performs automatic steering of the car 100.

The feedforward control unit 191 outputs a steering command value for feedforward control. Specifically, the feedforward control unit 191 selects the steering pattern information associated with the load detected by the load detection unit 140, among the steering pattern information stored by the storage unit 180 for each load of the car 100.

Then, the feedforward control unit 191 outputs the steering command value for the steering pattern information correlated with the traveling position detected by the traveling position detection unit 130.

The feedback control unit 192 feedback controls the traveling direction of the car 100 with the lateral deviation amount of the car 100 and the roll or lateral direction vibration amount of the car 100 as control object values, so as to minimize (reduce) the deviation amount and the roll or lateral direction vibration amount.

The feedback control unit 192 carries out feedback control so as to minimize not only the lateral deviation amount of the car 100 but also the roll or lateral direction vibration amount of the car 100, so that when the car 100 is automatically steered, it is possible to achieve both a reduction in roll or lateral direction vibration of the car 100 and a reduction in lateral deviation of the car 100.

The deviation amount detection unit 110, the roll or lateral direction vibration amount detection unit 120, the travel position detection unit 130, the storage unit 180, and the control unit 190 (including the feed forward control unit 191 and the feedback control unit 192) are collectively referred to as a steering control system 2. The steering control system 2 steers the car 100 by controlling the steering unit 150.

Further, the car 100 includes the steering control system 2, the steering unit 150 to be controlled by the steering control system 2, and the traveling tires 220. The car 100 is also referred to as a steering system 1.

The storage unit 180 and the control unit 190 may be configured using, for example, an on-board computer of the steering control system 2. In this case, the storage unit 180 is configured using a storage device provided in the on-board computer. The control unit 190 is configured by a CPU (Central Processing Unit) included in the on-board computer, that reads and executes a program from the storage unit 180.

Next, control of the steering of the car 100 by the control unit 190 will be described with reference to FIG. 3.

Figure 3:
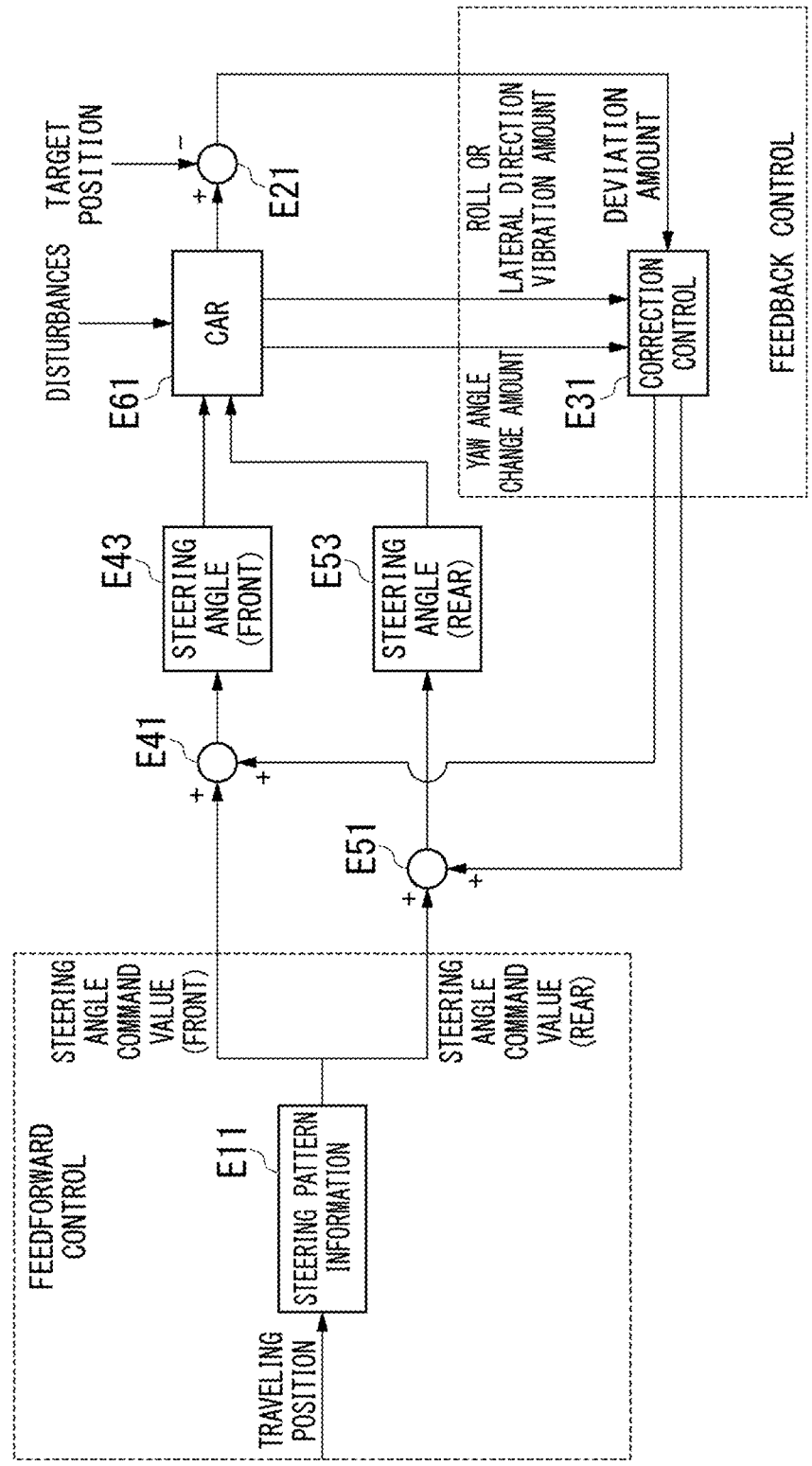
FIG. 3 is a block diagram showing an example of steering control of the car, performed by a control unit according to the first embodiment.

FIG. 3 is a block diagram showing an example of steering control of the car 100 performed by the control unit 190.

In the control shown in FIG. 3, the feedforward control unit 191 acquires the traveling position of the car detected by the traveling position detection unit 130, and reads and outputs the steering command value associated in the steering pattern information with the detected traveling position (element E11).

Therefore, each time the car 100 leaves the station, the feedforward control unit 191 reads the steering pattern information associated with the load of the car 100 detected by the load detection unit 140, from among a plurality of pieces of steering pattern information stored in the storage unit 180.

For example, the storage unit 180 stores steering pattern information for each of: a case where the car 100 is empty, a case where the car 100 is between empty and full, and a case where the car 100 is full.

The feedforward control unit 191 uses two threshold values preset for the load of the car 100, to classify the load of the car 100 detected by the load detection unit 140 into three stages of "light", "medium", and "heavy". When the load is classified as "light", the feedforward control unit 191 selects the steering pattern information for when the car 100 is empty. When the load is classified as "medium", the feedforward control unit 191 selects the steering pattern information for when the car 100 is between empty and full.

When the load is classified as "heavy", the feedforward control unit 191 selects the steering pattern information for when the car 100 is full.

The load of the car 100 does not change from when the car 100 leaves the station and arrives at the next station. Therefore, the feedforward control unit 191 continues to use the selected steering pattern information until the car 100 arrives at the next station.

In the example of FIG. 3, the storage unit 180 stores steering pattern information in which the traveling position, the steering command value for the front traveling tires 221, and the steering command value for the rear traveling tires 222 are associated with each other. Then, the feedforward control unit 191 reads and outputs the steering command value for the front traveling tires 221 and the steering command value for the rear traveling tires 222, which are associated with the traveling position detected by the traveling position detection unit 130.

The process in which the feedforward control unit 191 outputs the steering command value with respect to the input of the traveling position, corresponds to an example of the feedforward control.

Further, the deviation amount detection unit 110 subtracts a target position from the position of the car 100 in the width direction of the track, and detects the deviation amount of the position of the car 100 in the width direction of the track (element E21).

The target position here is the traveling position detected by the traveling position detection unit 130, on the reference traveling path.

The feedback control unit 192 feedback controls the steering of the car 100 based on the lateral deviation amount of the car 100, the roll or lateral direction vibration amount of the car 100, and the change amount of the yaw angle of the car 100 (element E31). However, it is not essential for the feedback control unit 192 to use the change amount of the yaw angle for control. The feedback control unit 192 may perform feedback control the steering of the car 100 based on the lateral deviation amount of the car 100 and the roll or lateral direction vibration amount of the car 100 without using the change amount of the yaw angle.

Specifically, the feedback control unit 192 uses an objective function including a lateral deviation amount of the car 100 and a roll or lateral direction vibration amount of the car 100, and performs optimal control to minimize the value of the objective function. The feedback control unit 192 acquires and outputs the steering command value for the front traveling tires 221 and the steering command value for the rear traveling tires 222 for optimum control.

For example, the following equation (1) can be used as the objective function used for the optimum control by the feedback control unit 192.

$$f = a^2 + b^2 \quad (1)$$

Here, "f" represents the objective function, "a" indicates the lateral deviation amount of the car 100, and "b" indicates the roll or lateral direction vibration amount of the car 100. However, the objective function for the optimum control of the feedback control unit 192 is not limited to the one shown in equation (1). Various objective functions can be used in which the value of the objective function increases as the lateral deviation amount of the car 100 increases, and the value of the objective function increases as the roll or lateral direction vibration amount of the car 100 increases.

The feedback control performed by the feedback control unit 192 is used in a form that corrects the steering command value by the feedforward control performed by the feedforward control unit 191. Therefore, feedback control performed by the feedback control unit 192 is also referred to as correction control.

The control unit 190 adds the steering command value for the front traveling tires 221 output by the feedback control unit 192 to the steering command value for the front traveling tires 221 output by the feedforward control unit 191 (element E41).

The control unit 190 outputs the steering command value for the front traveling tires 221 to the steering unit 150, and the steering unit 150 controls the direction of the front traveling tires 221 according to the obtained steering command value (element E43).

Further, the control unit 190 adds the steering command value for the rear traveling tires 222 output by the feedback control unit 192 to the steering command value for the rear traveling tires 222 output by the feedforward control unit 191 (element E51).

The control unit 190 outputs the steering command value for the rear traveling tires 222 to the steering unit 150, and the steering unit 150 controls the direction of the rear traveling tires 222 according to the obtained steering command value (element E53).

The car 100 travels in a traveling direction according to the direction of the front traveling tires 221 and the direction of the rear traveling tires 222. Furthermore disturbances are added to the traveling direction of the car 100 due to various factors such as the road surface 910, the load of the car 100, and wind. (element E61).

The steering pattern information may be acquired by simulation and stored in the storage unit 180.

For example, a model of the car 100 and the track 900 is constructed in a simulation computer. Further, the reference traveling path is set within the range of the track 900, such as for example a path traveling through the center of the track 900. Then, simulation of the traveling of the car 100 is performed for each of a plurality of cases of loadings of the car 100 such as for a case where the car 100 is empty, a case where it is between empty and full, and a case where it is full.

In the simulation, the control unit 190 is controlled so that the car 100 travels on the reference traveling path according to a scheduled operation diagram, and the steering command value from the control unit 190 to the steering unit 150 is recorded in association with the traveling position. As a result, steering pattern information for each load of the car 100 is obtained.

For example, the steering pattern information may be acquired so as to minimize the roll or lateral direction vibration amount and the lateral deviation amount, by repeating the simulation using both the roll or lateral direction vibration amount and the lateral deviation amount as an evaluation value, or using an evaluation value including the roll or lateral direction vibration amount and the lateral deviation amount.

As described above, the deviation amount detection unit 110 detects the deviation amount of the car 100 traveling on the track 900, from the reference traveling path of the car 100 in the width direction of the track 900. The roll or lateral direction vibration amount detection unit 120 detects the roll or lateral direction vibration amount of the car 100. The feedback control unit 192 performs feedback control of the steering of the car 100 so as to minimize the deviation amount of the car 100 and the roll or lateral direction vibration amount of the car 100.

When the feedback control unit 192 performs feedback control so as to minimize not only the lateral deviation amount of the car 100 but also the roll or lateral direction vibration amount of the car 100, so that the car 100 is steered automatically, it is possible to achieve both a reduction in the roll or lateral direction vibration of the car 100, and a reduction in the lateral deviation of the car 100.

In addition, the storage unit 180 stores steering pattern information indicating steering command values for each traveling position of the car 100. The traveling position detection unit 130 detects the traveling position of the car 100. The feedforward control unit 191 outputs a steering command value associated with steering pattern information for the traveling position detected by the traveling position detection unit 130.

It is possible to generate the steering pattern information in advance because the car 100 travels on the track 900 and the reference traveling path can be set on the track 900, and the operation diagram (speed pattern) is defined for the speed of the car 100. Since the storage unit 180 stores steering pattern information in advance, the feedforward control unit 191 can perform feedforward control of the steering of the car 100. By feedforward control of the steering of the car 100 according to the steering pattern information generated based on the reference traveling path, the feedforward control unit 191 can control the car 100 so as to travel based on the reference traveling path. In this respect, the feedforward control unit 191 can control the steering of the car 100 with high accuracy.

Further, the load detection unit 140 detects the load of the car 100. The storage unit 180 stores steering pattern information for each load of car 100. The feedforward control unit 191 outputs a steering command value for the traveling position of the car 100, associated with the steering pattern information corresponding to the load of the car 100.

Thus, the feedforward control unit 191 can perform feedforward control of the steering of the car 100 that reflects the load of the car 100. In this regard, the feedforward control unit 191 can perform feedforward control of the steering of the car 100 with high accuracy.

Further, since the process for controlling the steering is closed within the car 100, it is not necessary to perform communication for controlling the steering. In this regard, the amount of communication by the car 100 can be small. Moreover, from the point that there is no influence from communication time, delay in the processing time for control can be avoided.

By the control unit 190 performing the control of FIG. 3 in an autonomous travel section which is a section without a guide rail, the car 100 can travel in the autonomous travel section. In addition, vibration due to overshoot or the like is reduced compared to the case where the control unit 190 performs only feedback control, and in this regard, the ride comfort of the car 100 is better.

Further, by the control unit 190 performing the control of FIG. 3 in a section where the guide rail is present, it is expected that the car 100 can travel without the guide wheel 232 hitting the guide rail. As a result, a situation where the guide wheel 232 hits the guide rail from a state where the guide wheel 232 is not in contact with the guide rail, and the vibration is transmitted to the car 100 to degrade the ride comfort of the car 100 can be prevented, and degradation in the ride comfort can be reduced. Further, a situation where the guide wheel 232 contacts the guide rail and picks up the unevenness of the surface of the guide rail, and vibrations due to the unevenness are transmitted to the car 100 and degrade the ride comfort of the car 100 can be prevented.

Second Embodiment

Figure 4:
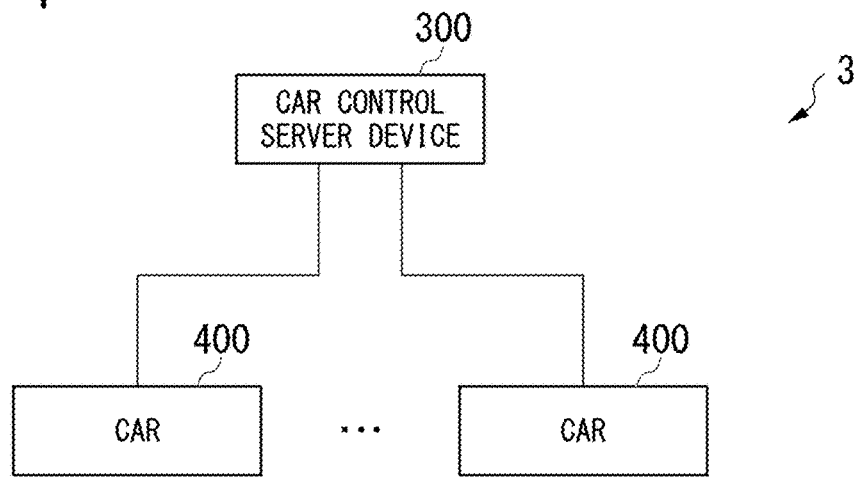
FIG. 4 is a schematic block diagram showing an apparatus configuration of a steering system according to a second embodiment.

FIG. 4 is a schematic block diagram showing an apparatus configuration of a steering system according to a second embodiment. As shown in FIG. 4, a steering system 3 includes a car control server device 300 and a car 400. The number of cars 400 fitted with the steering system 3 may be one or more.

The steering system 3 is a system for the car 400 to travel autonomously. The car control server device 300 transmits a steering command value to the car 400. The car control server device 300 and the car 400 have a server client configuration. The car control server device 300 acquires various information of the lateral deviation amount, the roll or lateral direction vibration amount, the traveling position, and the load for the car 400 from each of the cars 400, and transmits a steering command value for each car 400.

The car control server device 300 is configured using, for example, a computer such as a workstation. The car control server device 300 corresponds to an example of a car control device.

The car 400 travels by performing automatic steering in accordance with a steering command value from the car control server device 300.

Figure 5:
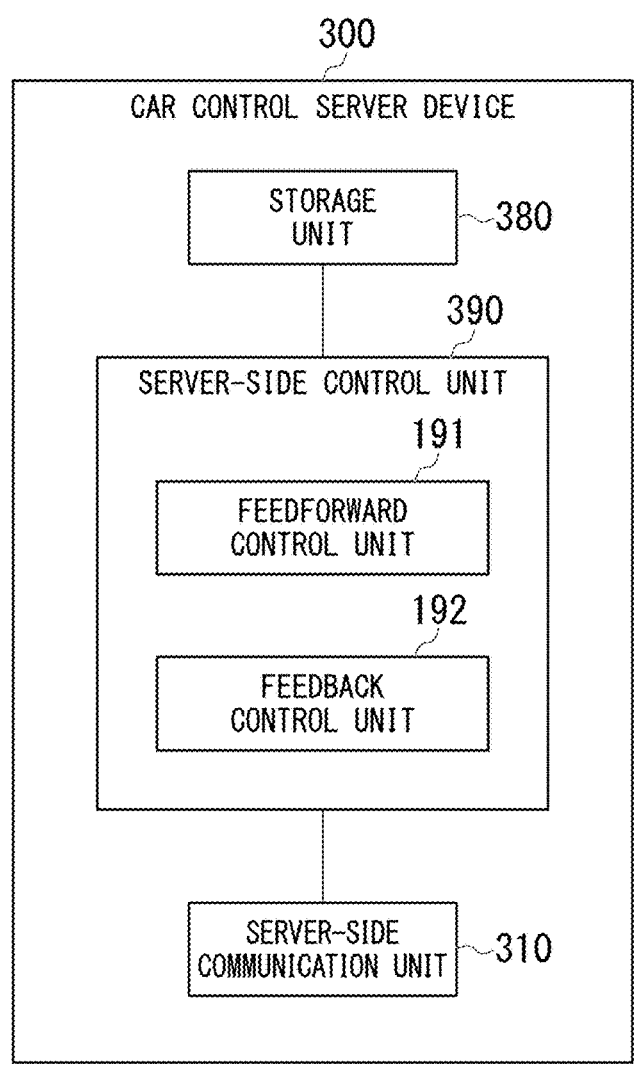
FIG. 5 is a schematic block diagram showing a functional configuration of a car control server apparatus according to the second embodiment.

FIG. 5 is a schematic block diagram showing a functional configuration of the car control server device 300. As shown in FIG. 5, the car control server device 300 includes; a server-side communication device 310, a storage unit 380, and a server-side control unit 390. The server-side control unit 390 includes; a feedforward control unit 191, and a feedback control unit 192.

Among the components shown in FIG. 5, components having the same functions as those shown in FIG. 1 are given the same reference numerals (191, 192) and the description thereof is omitted. Further, the track in the autonomous traveling section is the same as that described with reference to FIG. 2, and the reference numerals shown in FIG. 2 are also used in the second embodiment.

The server-side communication device 310 communicates with other devices. In particular, the server-side communication device 310 communicates with the car 400, and receives various information for the car 400 on the lateral deviation amount, the roll or lateral direction vibration amount, the traveling position, and the load, and transmits the steering command value for each car 400.

The storage unit 380 stores various information. In particular, the storage unit 380 stores steering pattern information for each load of the car 400 as in the case of the storage unit 180 (FIG. 1). As in the case of the storage unit 180, for example, the steering angle can be used as the steering command value.

The storage unit 380 is configured using a storage device provided in the car control server device 300.

The server-side control unit 390 controls each component of the car control server device 300 to perform various processes. In particular, the server-side control unit 390 outputs a steering command value to the steering unit 150 as in the case of the control unit 190 (FIG. 1). The control of steering of the car 400 performed by the server-side control unit 390 is the same as for the case of the server-side control unit 390 described with reference to FIG. 3.

Figure 6:
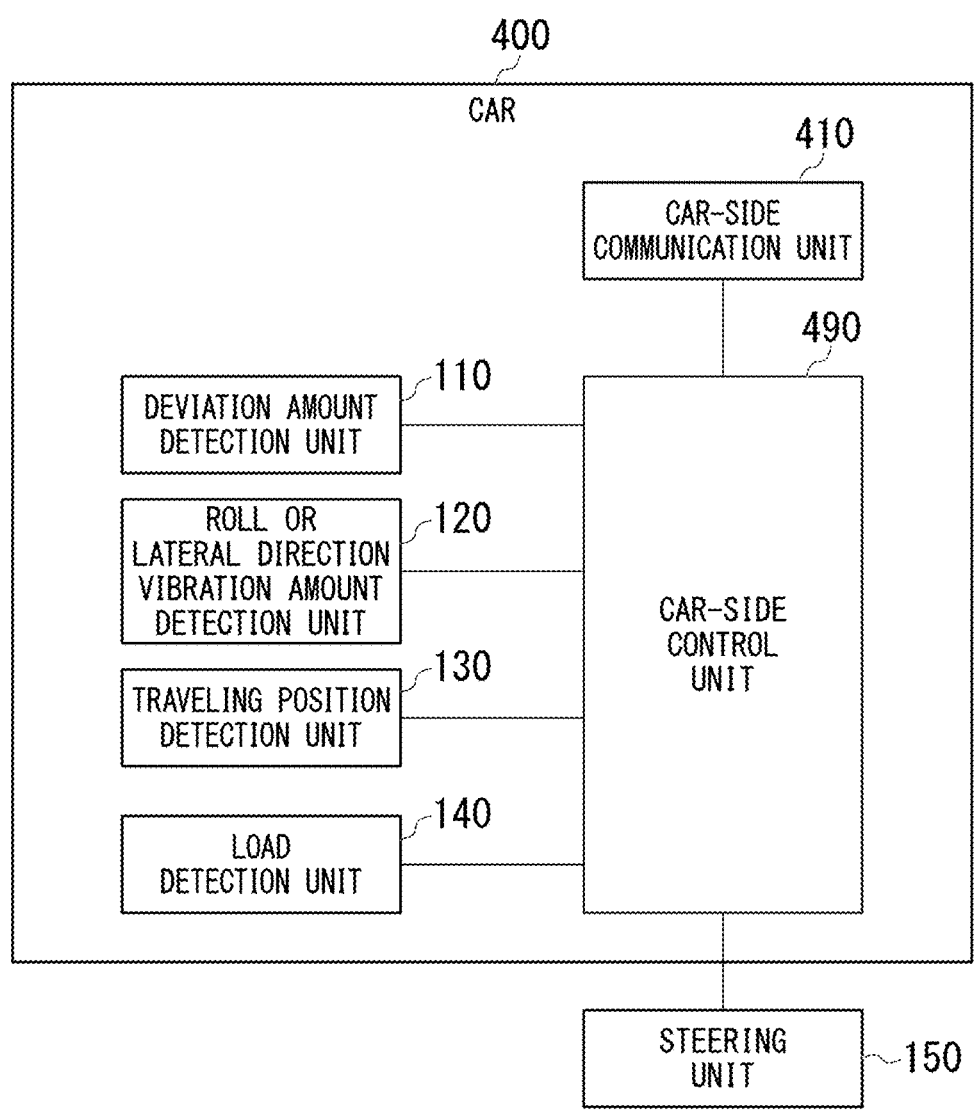
FIG. 6 is a schematic block diagram showing a functional configuration of a car according to the second embodiment.

FIG. 6 is a schematic block diagram showing a functional configuration of the car 400. As shown in FIG. 6, the car 400 includes; a deviation amount detection unit 110, a roll or lateral direction vibration amount detection unit 120, a traveling position detection unit 130, a load detection unit 140, a steering unit 150, a car-side communication unit 410, and a car-side control unit 490.

Among the components shown in FIG. 6, components having the same functions as those shown in FIG. 1 are given the same reference numerals (110, 120, 130, 140, 150), and descriptions thereof are omitted.

The car-side communication unit 410 communicates with other devices. In particular, the car-side communication unit 410 communicates with the server-side communication device 310 of the server-side control unit 390. The car-side communication unit 410 transmits each information of the lateral deviation amount, the roll or lateral direction vibration amount, the traveling position, and the load of the car 400 which includes the car-side communication unit 410 itself, to the server-side control unit 390, and receives the steering command value of each car 400.

The car-side control unit 490 controls each component within the car 400. In particular, the car-side control unit 490 transmits the various types of information detected by the deviation amount detection unit 110, the roll or lateral direction vibration amount detection unit 120, the traveling position detection unit 130, and the load detection unit 140, to the server-side control unit 390 via the car-side communication unit 410. Further, the car-side control unit 490 controls the steering unit 150 in accordance with the steering command value from the car control server device 300, received by the car-side communication unit 410.

The server-side communication device 310, the storage unit 380, the server-side control unit 390 (including the feed-forward control unit 191 and the feedback control unit 192), as well as a combination of the deviation amount detection unit 110, the roll or lateral direction vibration amount detection unit 120, the traveling position detection unit 130, the load detection unit 140, the car-side communication unit 410, and the car-side control unit 490 of the car 400 correspond to an example of a steering control system.

In the first embodiment, the entire steering control system 2 is provided in the car 100. On the other hand, in the second embodiment, the server-side control unit 390, which is a component that calculates the steering command value, is provided on the car control server device 300 side. Along with this, the car control server device 300 is provided with the server-side communication device 310, and the car 400 is provided with the car-side communication unit 410. For the other points, the second embodiment is the same as for the case of the first embodiment.

Thus, by providing the component for calculating the steering command value in the car control server device 300, a plurality of cars 400 can share one car control server device 300. In this respect, in the steering system 3, the configuration of the equipment can be simplified, and the device configuration can be simplified.

Third Embodiment

As described in the first embodiment, when the car 100 is used as a car capable of autonomously traveling by AGT, then from the viewpoint of reducing the area of the road surface reserved for traveling of the car 100 as much as possible, it is preferable that the lateral deviation amount of the car 100 be as small as possible. For example, while the tolerance of the deviation in automatic traveling of the car is said to be about 200 millimeters (mm), it is conceivable to set the tolerance of the lateral deviation amount of the car 100 to 50 millimeters. However, the allowable value of 50 mm is an example, and is not limited to this.

Thus, it is conceivable to set the allowable value of the lateral deviation amount of the car 100 to a relatively small value. On the other hand, if the control unit 190 performs relatively sensitive control so as to satisfy a relatively small allowable value, there is a possibility that vibration of the car 100 due to control overshoot tends to occur, and the ride comfort of the car 100 becomes relatively poor.

In the third embodiment, a method of ensuring ride comfort for the case where the allowable value of the lateral deviation amount of the car 100 is relatively small, will be described using a method of applying a frequency filter to the steering command value. Ensuring the ride comfort referred to here is to improve the ride comfort relatively.

The third embodiment is the same as the case of the first embodiment except for the control method of the car 100, and the description thereof is omitted here, and the same reference numerals as the first embodiment are used.

Figure 7:
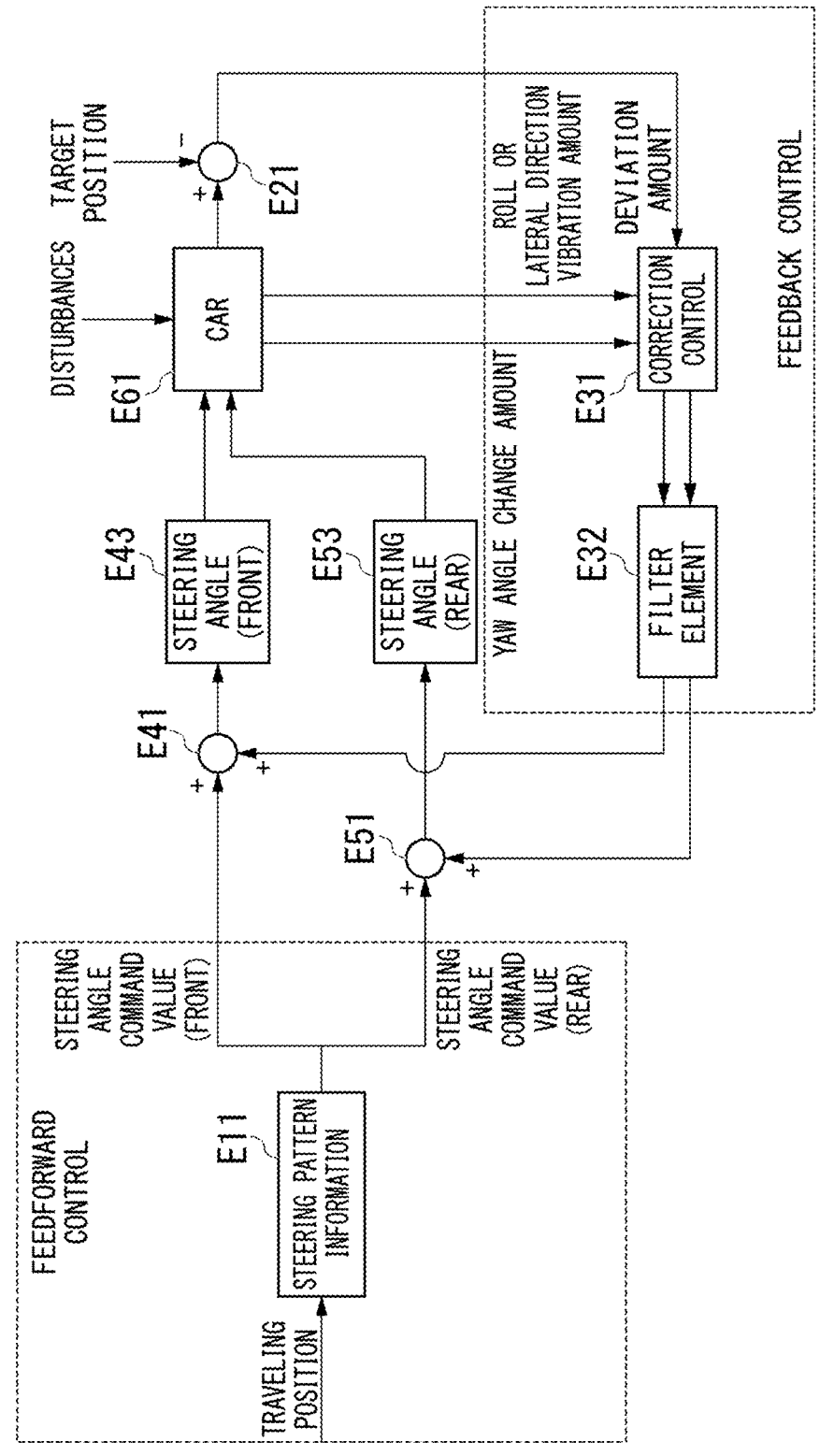
FIG. 7 is a block diagram showing an example of steering control of a car performed by a control unit according to a third embodiment.

FIG. 7 is a block diagram showing an example of control of steering of the car 100 performed by the control unit 190 according to the third embodiment.

The control shown in FIG. 7, differs from the case of FIG. 3 in that the feedback control unit 192 passes each of the steering command value for the front traveling tires 221 and the steering command value for the rear traveling tires 222 calculated in the element E31, through a filter (element E32), and then feeds back. Except for this point, the control shown in FIG. 7 is the same as that of FIG. 3, and the description thereof is omitted here, and the same reference numerals as in FIG. 3 are used.

As a filter that the feedback control unit 192 applies to the steering command value in the element E32, a frequency filter that reduces vibration at a frequency that easily affects the ride comfort may be used. Here, the reduction includes zeroing of vibration of a frequency that is likely to affect the ride comfort. That is, the term reduce here includes to remove vibration of a frequency that is likely to affect the ride comfort. The term reduce here also refers to eliminating or reducing.

For example, in reference to the standards of the American Automobile Association, it is conceivable to use a frequency filter that reduces vibrations from 4 Hertz (Hz) to 15 Hertz.

Specifically, the feedback control unit 192 may apply a band-stop filter or a notch filter that reduces vibration of 4 to 15 Hz, to the steering command value. The band stop filter is a filter that reduces a specific frequency. The notch filter is a type of band stop filter, and in particular, is a filter with a narrow range of frequencies to be reduced.

Alternatively, the feedback control unit 192 may apply a high-pass filter that reduces vibrations of 15 Hz or less, to the steering command value.

In particular, the feedback control unit 192 is expected to improve the ride comfort of the car 100 by reducing vibrations of frequencies that are likely to affect the ride comfort. In addition, the feedback control unit 192 can perform feedback control that quickly responds to disturbances such as gusts, by not reducing vibrations with relatively high frequencies. As a result, a situation where the guide wheel 232 hits the guide rail, and generates vibrations to degrade the ride comfort of the car 100 can be prevented, and degradation in the ride comfort can be reduced.

Alternatively, the feedback control unit 192 may apply a low-pass filter that reduces vibrations of 4 Hz or more, to the steering command value. The low pass filter is represented by a first-order lag element.

Alternatively, referring to ISO 2631, the feedback control unit 192 may apply a low-pass filter that reduces vibrations of 2 Hz or more, to the steering command value.

Simulation results of the movement of the car 100 when the feedback control unit 192 applies the frequency filter to the steering command value will be described with reference to FIG. 8 to FIG. 12.

Figure 8:
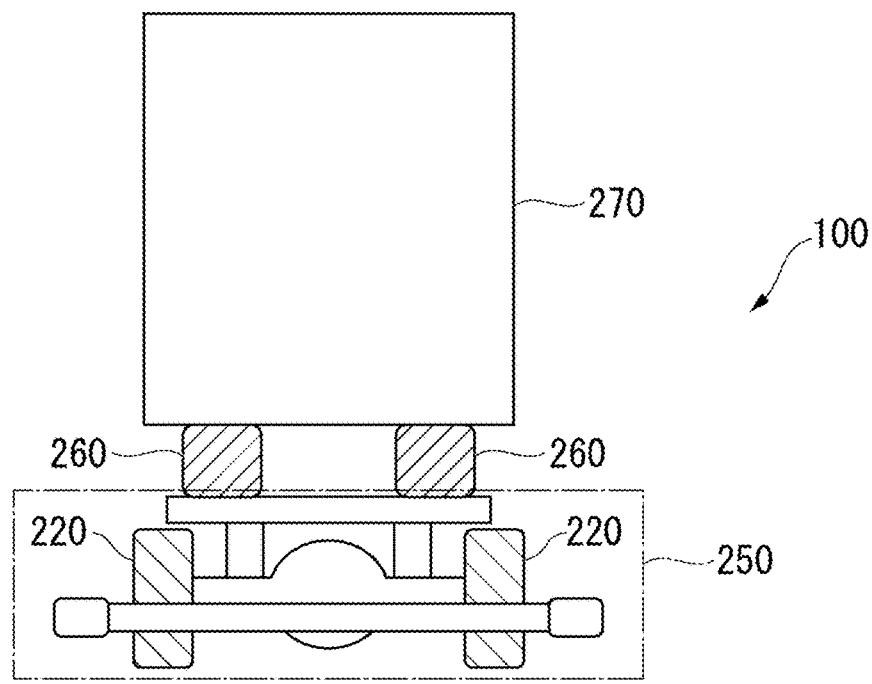
FIG. 8 is a diagram showing an example of a configuration of a car used for simulation according to the third embodiment.

FIG. 8 is a diagram showing an example of the configuration of the car 100 used for the simulation. In the example of FIG. 8, the car 100 includes an undercarriage 250, air springs 260, and a car body 270.

Traveling tires 220 are provided on the undercarriage 250. The undercarriage 250 rotates the traveling tires 220 while changing the direction of the traveling tires 220 according to the control of the control unit 190, so that the car 100 travels. Here, a configuration is used in which the undercarriage 250 is divided into a front undercarriage 250 including the front traveling tires 221 and a rear undercarriage 250 including the rear traveling tires 222.

Further, the car body 270 is loaded on the undercarriage 250, and the air springs 260 are provided between the undercarriage 250 and the car body 270. The car body 270 accommodates a passenger. That is, the passenger gets into the car body 270. The air springs 260 adjust the hardness of the air spring 260 itself by changing the amount of air according to the change in weight caused by the passenger getting into the car body 270.

Components of the undercarriage 250 (excluding the traveling tires 220), and the air springs 260, and the car body 270 correspond to an example of a car main body.

The configuration of FIG. 8 may be applied to either one or both of the first embodiment and the second embodiment.

Figure 9:
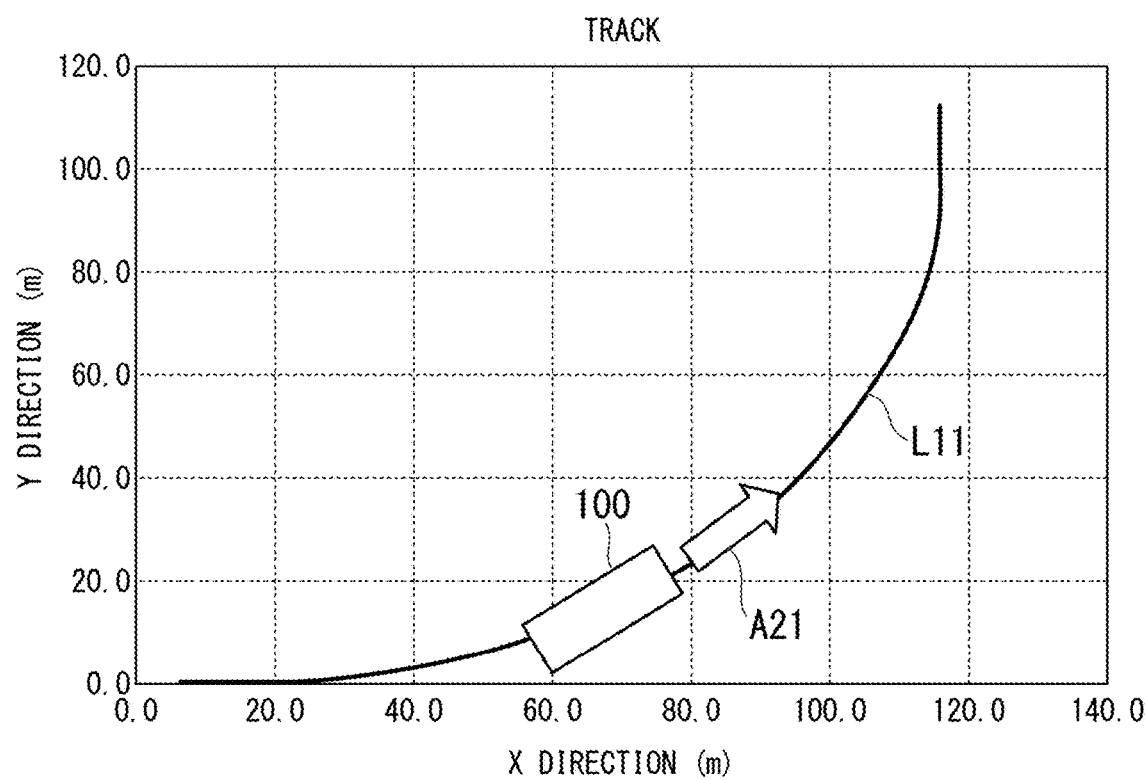
FIG. 9 is a diagram showing an example of a track of a car in the simulation according to the third embodiment.

FIG. 9 is a diagram showing an example of the track of the car 100. Line L11 indicates a target track of the car 100 used for the simulation. The simulation result for the traveling track of the car 100 is also substantially the same track as the line L11. Arrow A21 indicates the traveling direction of the car 100.

FIG. 9 shows an example in which the track of the car 100 enters a curved section from a straight section, then the car 100 turns to the left, and then the track of the car 100 enters a straight section.

Figure 10:
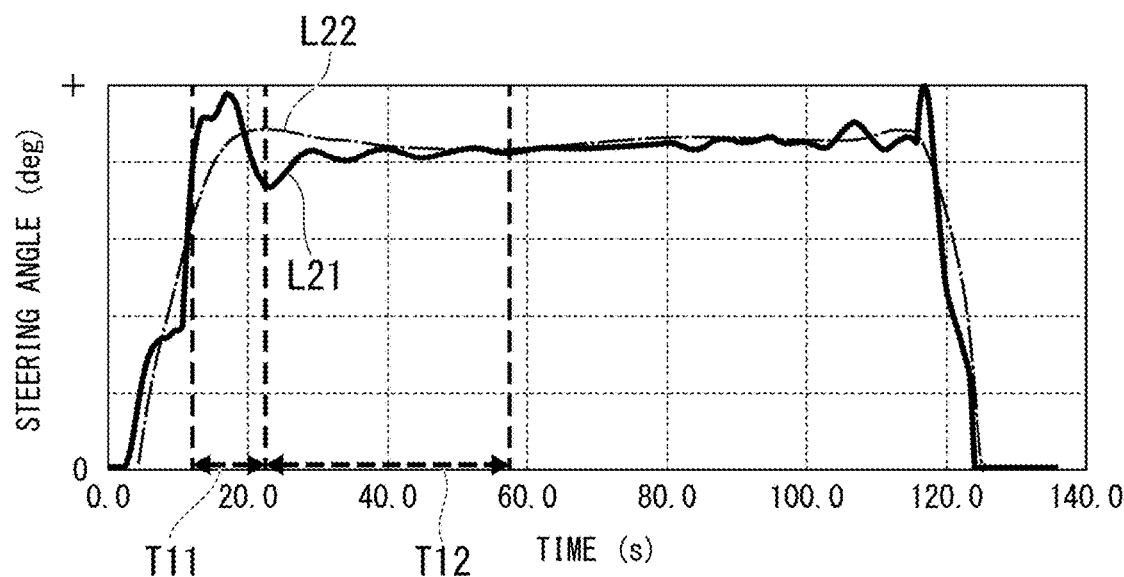
FIG. 10 is a diagram showing an example of a steering angle obtained by the simulation according to the third embodiment.

FIG. 10 is a diagram showing an example of a steering angle obtained by the simulation. The horizontal axis of FIG. 10 indicates time. The units of the horizontal axis are seconds. The vertical axis indicates the steering angle. Although detailed numerical values are not shown on the vertical axis of FIG. 10, degrees can be used as a unit of the steering angle. FIG. 10 shows an example of the steering angle of the front traveling tires 221.

The line L21 indicates an example of the steering angle when the feedback control unit 192 does not apply a frequency filter to the steering command value. The line L22 indicates an example of the steering angle when the feedback control unit 192 applies a frequency filter to the steering command value.

When the line L21 and the line L22 are compared, in the line L21, the steering angle rapidly changes in the interval of time T21 after the car 100 enters the curved area from the straight line area. In the interval of time T22, vibration due to control overshoot occurs.

On the other hand, in the line L22, the change in the steering angle in the interval of time T21 is relatively gentle. Moreover, the overshoot of control in the interval of time T22 is suppressed.

Figure 11:
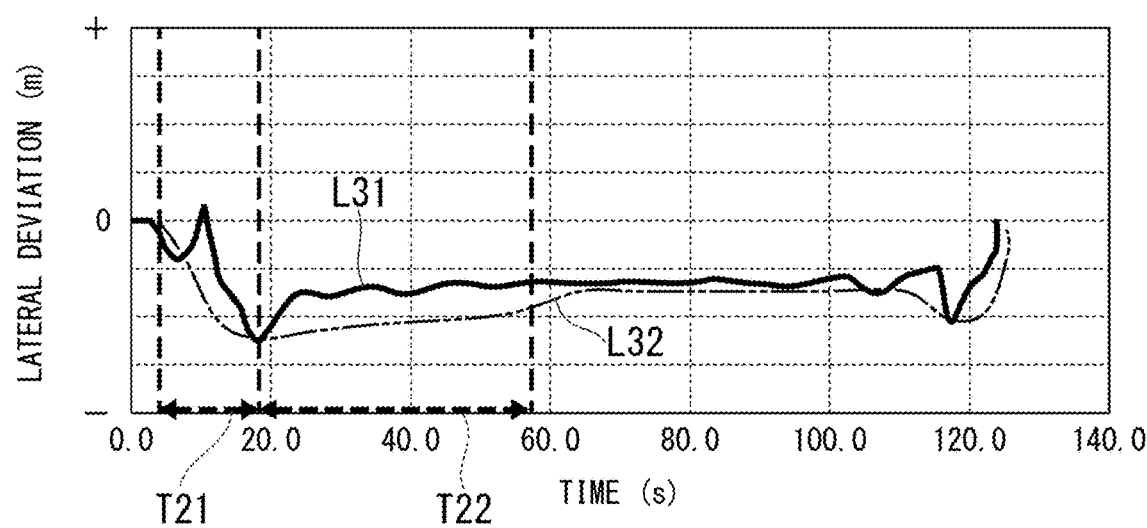
FIG. 11 is a diagram showing an example of lateral deviation obtained by the simulation according to the third embodiment.

FIG. 11 is a diagram showing an example of lateral deviation obtained by the simulation. The horizontal axis of FIG. 11 indicates time. The units of the horizontal axis are seconds. The vertical axis indicates the lateral deviation of the car 100. Specifically, the vertical axis indicates the deviation of the position of the front undercarriage 250 from the reference position. Although detailed numerical values are not shown on the vertical axis of FIG. 11, meters (m) can be used as a unit of deviation. The absolute value of this deviation indicates the amount of deviation.

The line L31 indicates an example of the lateral deviation amount when the feedback control unit 192 does not apply a frequency filter to the steering command value. The line L32 indicates an example of the lateral deviation amount when the feedback control unit 192 applies a frequency filter to the steering command value.

When the line L31 and the line L32 are compared, the amount of deviation in the line L31 can be controlled to be smaller. On the other hand, in the line L32, the change in the amount of deviation is relatively more gentle. Specifically, in the line L32, in the interval of time T21, the amount of deviation increases relatively gently. Then, in the interval of time T22, the amount of deviation decreases relatively slowly.

In the simulation, the tolerance value of the lateral deviation amount is set to 5 mm, and in both the case of the line L31, and the case of the line L32, this tolerance is satisfied.

Figure 12:
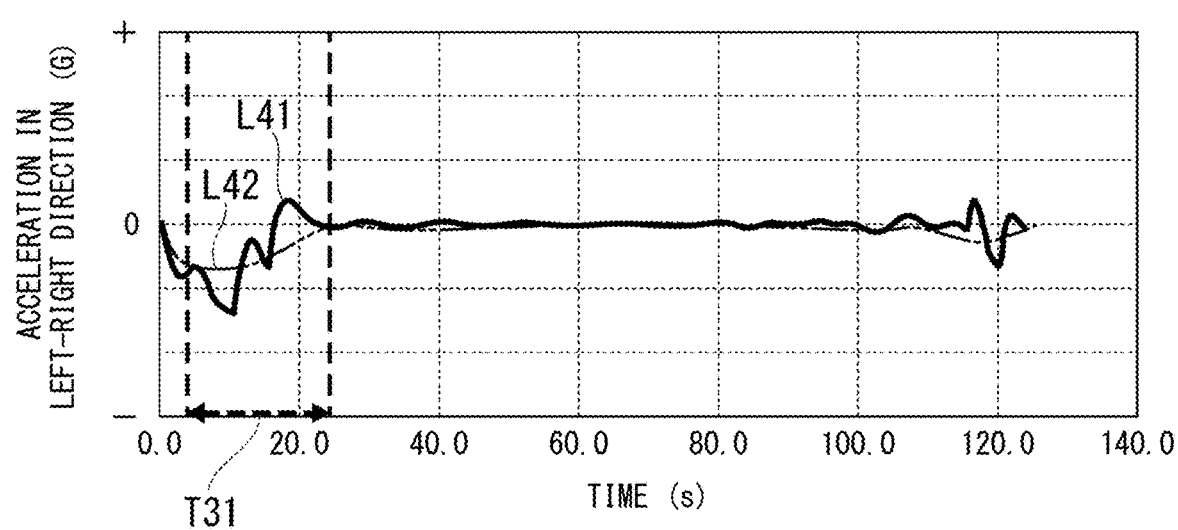
FIG. 12 is a diagram showing an example of a roll or lateral direction vibration amount obtained by the simulation according to the third embodiment.

FIG. 12 is a diagram showing an example of the roll or lateral direction vibration amount obtained by the simulation. The horizontal axis of FIG. 12 indicates time. The units of the horizontal axis are seconds. The vertical axis indicates roll or lateral direction vibration. Specifically, the vertical axis indicates the acceleration in the left-right direction of the car body. Although detailed numerical values are not shown on the vertical axis of FIG. 12, G can be used as a unit of acceleration. The absolute value of this acceleration indicates the amount roll or lateral direction vibration.

The line L41 indicates an example of the roll or lateral direction vibration amount when the feedback control unit 192 does not apply a frequency filter to the steering command value. The line L42 indicates an example of the roll or lateral direction vibration amount when the feedback control unit 192 applies a frequency filter to the steering command value.

When the line L41 and the line L42 are compared, the amount of roll or lateral direction vibration in the line L42 is smaller.

In particular, in the interval of time T31, the roll or lateral direction vibration amount is smaller in the line L42, and the change in roll or lateral direction vibration is gradual. Therefore, the ride comfort of the car 100 is improved by the feedback control unit 192 applying the frequency filter to the steering command value.

The feedback control unit 192, by the filtering in the element E32, may reduce the vibration of the natural frequency in the roll or lateral direction vibration of the car 100 in addition to or instead of reducing the vibrations of the frequencies that are likely to affect the ride comfort.

For example, in the configuration shown in FIG. 8 in which the undercarriage 250 and the car body 270 are coupled with the air springs 260 interposed therebetween, the natural frequency in the lateral movement of the car body 270 is used as the natural frequency in the lateral movement of the car 100. In this configuration, the natural frequency in the roll or lateral direction vibration of the car body 270 is a function with the load of the car body 270 and the rigidity of the air springs 260 as input parameters. The load of the car body 270 is the same as the load of the car 100 described above. For example, assuming that the total weight of the car body 270 which is the sum of the load of the car body 270 and the weight of the car body 270 itself is m, and the stiffness of the air spring 260 is k, then the natural frequency of in the lateral motion of the car body 270 is indicated as in equation (2).

$$nf = \frac{1}{2\pi} \times \sqrt{\frac{k}{m}} \qquad (2)$$

Since the load of the car body 270 itself is expressed by a constant, equation (2) is a function with the load of the car body 270 and the rigidity of the air springs 260 as input parameters.

In the car 100, the vibration of the natural frequency tends to be large. The feedback control unit 192 is expected to reduce the roll or lateral direction vibration of the car 100 by reducing the vibration of the natural frequency in the roll or lateral direction vibration of the car 100.

For example, the control unit 190 acquires the load of the car 100 detected by the load detection unit 140.

Further, the control unit 190 controls the air amount of the air springs 260 in accordance with the load of the car 100 to thereby know the rigidity of the air springs 260. Therefore, control unit 190 calculates the natural frequency in the roll or lateral direction vibration of car 100 based on the load of car 100 and the rigidity of air springs 260. The feedback control unit 192 sets, as a filter in the element E32, a band stop filter or a notch filter that reduces vibration in a band including the obtained natural frequency.

Passengers get on and off at the station, and the load of the car 100 is constant between the stations. Therefore, after the passengers get on and off at the station and the door of the car 100 is closed, the control unit 190 obtains the load of the car 100 and determines and controls the air amount of the air springs 260. Further, the control unit 190 calculates the natural frequency in the roll or lateral direction vibration of car 100. The feedback control unit 192 sets a filter in the element E32 each time the control unit 190 calculates the natural frequency. The feedback control unit 192 maintains filter settings between stations.

When the car 100 is configured as an articulated vehicle, the load of the car 100 at the movement source and the load of the car 100 at the movement destination changes due to the passengers moving from one car 100 to another car 100. However this can be ignored in relation to weight of the car 100 itself.

Alternatively, the feedback control unit 192 may set the frequency filter based on the natural frequency calculated from the fixed load assumed value. For example, the control unit 190 may calculate the natural frequency in the roll or lateral direction vibration of the car 100 based on a load that frequently occurs on the car 100. Then, the feedback control unit 192 may set a band cut filter that cuts a relatively wide frequency band centered on the calculated natural frequency.

When the lateral deviation amount of the car 100 approaches the limit of the allowable value, the feedback control unit 192 may stop applying the filter to the steering command value. For example, when the maximum allowable value of the lateral deviation of the car 100 is 50 mm, then when the lateral deviation of the car 100 becomes 40 mm or more, the feedback control unit 192 may cancel application of the filter to the steering command value.

For example, it may be considered that the degradation in the ride comfort of the car 100 due to the guide wheel 232 hitting the guide rails is larger than the degradation in the ride comfort of the car 100 due to turning off the filter. In this case, it is expected that the feedback control unit 192 temporarily turns off the filter, so that the guide wheel 232 can be prevented from hitting the guide rails, and the degradation in the ride comfort of the car 100 can be reduced.

In addition, in an autonomous traveling section without a guide rail, a case of an undesirable situation can be considered such as, when the lateral deviation amount of the car 100 becomes larger than the allowable value, the car 100 deviates from the track, or the car 100 contacts another object. In this case, it is expected that the feedback control unit 192 temporarily turns off the filter to prevent the lateral deviation of the car 100 from becoming larger than the allowable value, thereby enabling an undesirable situation to be avoided.

When the feedback control unit 192 performs both the filtering of the vibration of the frequency that easily affects the ride comfort of the car 100, and the filtering of the vibration of the natural frequency in the roll or lateral direction vibration of the car 100, only one of them need to be stopped, or both may be stopped.

The load detection unit 140 may calculate the load of the car 100 from the air pressure of the air spring 260. It is common practice to constantly measure the pressure of the air spring in the car. Therefore it is not necessary for the load detection unit 140 to provide a dedicated sensor for detecting the load of the car 100. Alternatively, the load detection unit 140 may include a sensor such as a load cell for detecting the load of the car 100.

The load detection method of the load detection unit 140 described here may be applied to either one or both of the first embodiment and the second embodiment.

As described above, the feedback control unit 192 applies a frequency filter to the steering command value in the feedback control.

By applying this frequency filter, a predetermined frequency component from the steering command value can be reduced, and the vibration at that frequency component in the vibration of the car 100 can be reduced.

By reducing the vibration of the predetermined frequency component in the vibration of the car 100, it is expected that the ride comfort of the car 100 will be relatively improved.

Further, the feedback control unit 192 selectively reduces the specific frequency component from the steering command value thereby enabling a coexistence of relative improvement in the ride comfort of the car 100, and control of the traveling of the car 100 with relatively high accuracy.

Further, the feedback control unit 192 uses a frequency filter that removes or reduces vibration of a predetermined frequency determined as a frequency that easily affects the ride comfort.

Thus, among the vibrations of the car 100, the vibrations of frequency components that easily affect the ride comfort are eliminated or reduced, and in this respect it is expected that the ride comfort of the car 100 is improved.

Also, the feedback control unit 192 uses a frequency filter that removes or reduces the vibration of the natural frequency of the car 100. Thereby, the reduction effect of the vibration of the car 100 becomes relatively large, and in this respect it is expected that the ride comfort of the car 100 is improved.

When a plurality of cars 100 are connected and operated, the third embodiment may be applied to each car 100. In particular, when the difference in load between the cars 100 is relatively small, it is expected that each car 100 performs the same motion, and the movement is the same as in the case of single operation of one car 100.

Although the case where the third embodiment is implemented using the first embodiment has been described above as an example, the third embodiment may be implemented using the second embodiment.

Fourth Embodiment

In addition to or instead of the feedback control unit 192 applying the frequency filter to the steering command value, an actuator provided in the car 100 may be provided with a first-order lag element for the steering command value. This point will be described in the fourth embodiment.

The fourth embodiment is the same as the case of the first embodiment except that the actuator is provided with a first-order lag element for the steering command value. The same reference numerals as in the first embodiment are used.

Figure 13:
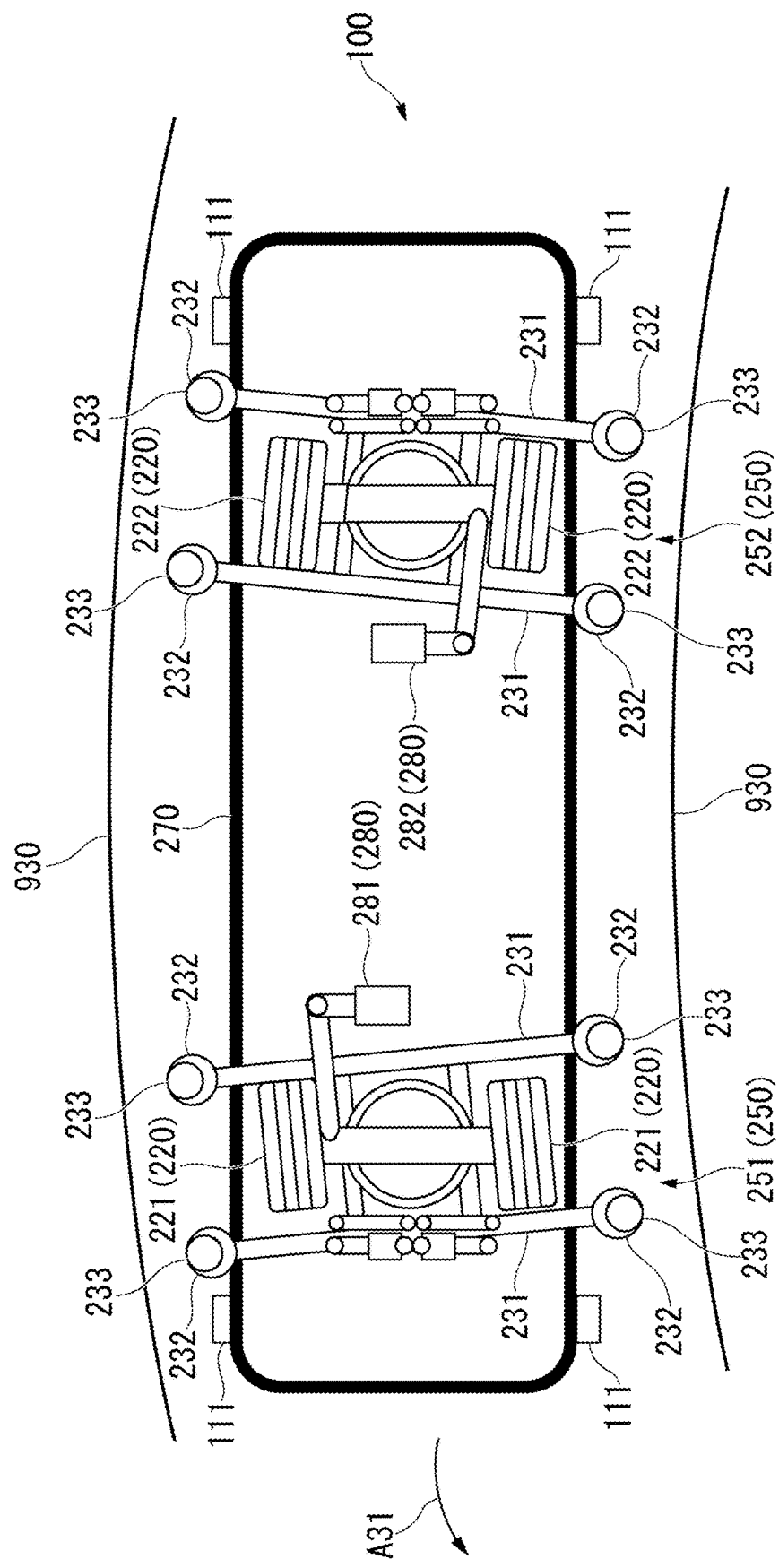
FIG. 13 is a diagram showing an arrangement example of actuators in the car according to a fourth embodiment.

FIG. 13 is a diagram showing an arrangement example of actuators in the car 100. FIG. 13 shows an example in which the car 100 is viewed from the lower side (from the side of the track 900). In the example of FIG. 13, a configuration is shown in which the car 100 includes the two undercarriages 250 of a front undercarriage 251 and a rear undercarriage 252, and the car body 270. The front undercarriage 251 includes; front traveling tires 221, supports 231, guide wheels 232, branch wheels 233, and a front actuator 281. The rear undercarriage 252 includes; rear traveling tires 222, supports 231, guide wheels 232, branch wheels 233, and a rear actuator 282. The front actuator 281 and the rear actuator 282 are collectively referred to as an actuator 280.

Further, in the example of FIG. 13, the car body 270 includes distance sensors 111, and the arrangement is shown in which the distance sensors 111 are installed on the side surfaces of the four corners of the car body 270.

The arrow A31 indicates the traveling direction of the car 100. Further, in FIG. 13, guide rails 930 are shown. However, the fourth embodiment is also applicable to an autonomous traveling section of the car 100.

The arrangement of FIG. 13 may be applied to any one or more of the first to third embodiments.

The actuator 280 sets the direction of the traveling tires 220 to the direction indicated by the steering command value, in accordance with the steering command value from the control unit 190. However, the actuator 280 is provided with a first-order lag element for the steering command value, and functions as a low pass filter for the steering command value. As a result, when the car 100 operates in accordance with the steering command value, vibrations of frequency components for the lateral movement of the car 100 that are higher than a predetermined frequency are reduced. From the point that vibration is reduced from the lateral movement of the car 100, it is expected that the ride comfort of the car 100 will be relatively high.

The first-order lag element of the actuator 280 may be configured as a hydraulic first-order lag element, where for example the actuator 280 is provided with a hydraulic cylinder. Alternatively, if the actuator 280 is configured using an electric motor, a first-order lag element such as a flywheel may be provided to increase the inertia of the electric motor. Alternatively, when the actuator 280 is configured to include a ball screw, a first-order lag element may be provided in which the resistance of the ball screw is increased, such as by using a relatively high viscous oil as a lubricating oil for the ball screw.

As described above, the actuator 280 that operates according to the feedback control of the feedback control unit 192 is provided with a first-order lag element for the control command value.

Thereby, the vibration of the car 100 is suppressed, and in this respect it is expected that the ride comfort of the car 100 is good.

Although the case where the fourth embodiment is implemented using the first embodiment has been described above as an example, the fourth embodiment may be implemented using either one of the second embodiment and the third embodiment. Alternatively, the fourth embodiment may be implemented using both the second embodiment and the third embodiment.

Differences between the present invention and the invention described in Patent Document 2 will be further described.

In the cited reference 2, when determining the optimal target steering angle used as a target value of a steering angle, determining so that the vibration resulting from the steering of a car may be minimized is described. By controlling the steering angle on the basis of the optimal target steering angle determined in this manner, it is expected that the vibration caused by the steering of the car can be minimized.

On the other hand, in one aspect of the present invention, the feedback control unit 192 sets the lateral deviation amount of the car 100 and the roll or lateral direction vibration amount of the car 100 as control target values, and feedback controls the traveling direction of the car 100 so as to minimize the deviation amount and the roll or lateral direction vibration amount. Thus, according to one aspect of the present invention, not only the vibration caused by the steering of the car but also the vibration such as lateral deviation and roll or lateral direction vibration of the car can be reduced.

Further, in one aspect of the present invention, the feedback control unit 192 reduces the vibration of the natural frequency using the natural frequency of the roll or lateral direction vibration of the car body 270 as the natural frequency of the roll or lateral direction vibration of the car 100. Thus, in one aspect of the present invention, it is possible to reduce the vibration of the car body in which the passenger rides, and in this respect, the influence on the ride comfort is significant.

Further, Patent Document 2 describes that machine learning is performed by a neural network or a genetic algorithm, and a target steering angle is calculated using the result of the machine learning. By this machine learning, the target steering angle can be calculated automatically.

On the other hand, in one aspect of the present invention, the feedback control unit 192 performs control using a method other than machine learning, such as performing optimal control that minimizes the value of the objective function. Thus, in one aspect of the present invention, control can be performed without having to collect learning data by, for example, traveling the same path repeatedly.

Further, Patent Document 2 describes that a position detection sensor is disposed at a leading portion of an upper portion of a car to detect a distance deviation in a width direction of a traveling rail surface. By detecting this distance deviation, it is possible to detect a deviation in which the lateral deviation amount of the car with respect to the track and the roll or lateral direction vibration width of the car due to the vibration are combined, and can be reflected in the control of steering.

On the other hand, in one aspect of the present invention, the deviation amount detection unit 110 detects the amount of deviation of the position of the car 100 in the lateral direction (the width direction of the track) of the track from the reference traveling path. The roll or lateral direction vibration amount detection unit 120 includes, for example, an acceleration sensor, and detects the acceleration in the lateral direction of the car 100 or the integrated amount of acceleration as the roll or lateral direction vibration amount. By thus detecting both the lateral deviation amount of the car 100 and the roll or lateral direction vibration amount of the car 100, positive control can be performed correspondingly. For example, when the feedback control unit 192 performs feedback control so as to minimize not only the lateral deviation amount of the car 100 but also the roll or lateral direction vibration amount of the car 100, so that the car 100 is steered automatically, the reduction in the roll or lateral direction vibration of the car 100 and the reduction in the lateral deviation of the car 100 can be made compatible.

A program for realizing all or a part of functions of the control unit 190 and the server-side control unit 390 may be recorded in a computer readable recording medium, and the program recorded in the recording medium may be read into a computer system and executed, to perform the processing of each part. Here, the "computer system" includes an OS and hardware such as peripheral devices.

Moreover, the "computer system" also includes a homepage providing environment (or display environment) if the WWW system is used.

Furthermore, "computer-readable recording medium" means a portable medium such as a flexible disk, a magneto-optical disk, a ROM, a CD-ROM, or a storage device such as a hard disk built into a computer system. The program may be for realizing a part of the functions described above. Moreover, the functions may be realized by combining with a program already recorded in the computer system.

Embodiments of the present invention have been described in detail with reference to the drawings. However, the specific configurations are not limited to these embodiments, and design changes and the like within the scope of the present invention are also included.

What is claimed is:

1. A steering control system comprising:
a deviation amount detection unit configured to detect a deviation amount of a car that travels on a track, from a reference traveling path of the car in a width direction of the track;
a roll or lateral direction vibration amount detection unit configured to detect a roll or lateral direction vibration amount of the car;
a feedback control unit configured to perform feedback control of steering of the car so as to reduce the deviation amount and the roll or lateral direction vibration amount,
wherein the feedback control unit is configured to output a steering command value in which a specified frequency to be reduced is suppressed;
a storage unit configured to store steering pattern information indicating a steering command value for each traveling position of the car;
a traveling position detection unit configured to detect a traveling position of the car;
a feedforward control unit configured to output, based on the steering pattern information, the steering command value associated with the traveling position detected by the traveling position detection unit; and
a load detection unit configured to detect a load of the car, wherein the storage unit is configured to store steering pattern information for each load of the car, and
wherein the feedforward control unit is configured to output the steering command value associated with the detected traveling position of the car, based on the steering pattern information corresponding to the load detected by the load detection unit.

2. The steering control system according to claim 1, wherein the feedback control unit is configured to apply a frequency filter to remove or reduce the specified frequency to be reduced.

3. The steering control system according to claim 2, wherein the feedback control unit is configured to apply the frequency filter, to remove or reduce a vibration of a predetermined frequency determined as a frequency that easily affects ride comfort.

4. The steering control system according to claim 2, wherein the feedback control unit is configured to apply the frequency filter to remove or reduce a vibration of a natural frequency of the car.

5. The steering control system according to claim 1, wherein the feedback control unit is configured to specify the frequency to be reduced by calculating a natural frequency of the car.

6. A steering control system comprising:
a deviation amount detection unit configured to detect a deviation amount of a car that travels on a track, from a reference traveling path of the car in a width direction of the track;
a roll or lateral direction vibration amount detection unit configured to detect a roll or lateral direction vibration amount of the car; and
a feedback control unit configured to perform feedback control of steering of the car so as to reduce the deviation amount and the roll or lateral direction vibration amount,
wherein the feedback control unit is configured to output a steering command value in which a specified frequency to be reduced is suppressed, and
wherein the frequency to be reduced is specified by simulation using a car including an undercarriage, an air spring, and a car body.

7. The steering control system according to claim 1, wherein the frequency to be reduced is a frequency that easily affects ride comfort of the car.

8. The steering control system according to claim 1, wherein the frequency to be reduced is a natural frequency of the car.

9. A steering system comprising a car and a car control device, wherein the car comprises:
a deviation amount detection unit configured to detect a deviation amount of the car that travels on a track, from a reference traveling path of the car in a width direction of the track;
a roll or lateral direction vibration amount detection unit configured to detect a roll or lateral direction vibration amount of the car;
a traveling position detection unit configured to detect a traveling position of the car; and
a load detection unit configured to detect a load of the car, wherein the car control device comprises:
a feedback control unit configured to perform feedback control of steering of the car so as to reduce the deviation amount and the roll or lateral direction vibration amount;
a storage unit configured to store steering pattern information indicating a steering command value for each traveling position of the car; and
a feedforward control unit configured to output, based on the steering pattern information, the steering command value associated with the traveling position detected by the traveling position detection unit, and wherein the feedback control unit is configured to output a steering command value in which a specified frequency to be reduced is suppressed, wherein the storage unit is configured to store steering pattern information for each load of the car, and wherein the feedforward control unit is configured to output the steering command value associated with the detected traveling position of the car, based on the steering pattern information corresponding to the load detected by the load detection unit.

* * * * *